United States Patent [19]

Nishikawa et al.

[11] Patent Number: 4,628,317

[45] Date of Patent: Dec. 9, 1986

[54] INTER-VEHICLE DISTANCE CONTROL SYSTEM FOR VEHICLES

[75] Inventors: Masao Nishikawa, Tokyo; Takashi Aoki, Saitama, both of Japan

[73] Assignee: Honda Giken Kogyo Kabushiki Kaisha, Tokyo, Japan

[21] Appl. No.: 288,033

[22] Filed: Jul. 29, 1981

[30] Foreign Application Priority Data

Aug. 4, 1980 [JP]  Japan ................................. 55-106949

[51] Int. Cl.⁴ ........................... G08G 1/16; B60Q 1/44; B60T 7/12; G01S 13/93
[52] U.S. Cl. ................................... 340/903; 340/104; 180/169; 367/909; 342/71
[58] Field of Search ........... 343/7 VM; 340/903, 104; 367/909; 180/169

[56] References Cited

U.S. PATENT DOCUMENTS

| | | | |
|---|---|---|---|
| 3,778,826 | 12/1973 | Flannery et al. | 343/7 VM |
| 3,786,507 | 1/1974 | Hurd, Jr. | 343/7 VM |
| 3,921,749 | 11/1975 | Kawada | 343/7 VM X |
| 3,952,301 | 4/1976 | Sorkin | 343/7 VM |

Primary Examiner—T. H. Tubbesing
Assistant Examiner—Gilberto Barrón, Jr.
Attorney, Agent, or Firm—Irving M. Weiner; Joseph P. Carrier; Pamela S. Burt

[57] ABSTRACT

An inter-vehicle distance control system for a vehicle wherein the distance between the vehicle and a preceding object and a relative velocity therebetween are detected by a detection system such as a radar system, and when this distance has become shorter than a predetermined value, a reaction force is imparted to a throttling operation member such as a throttling pedal. The vehicle operator is effectively advised of this fact.

11 Claims, 3 Drawing Figures

INTER-VEHICLE DISTANCE CONTROL SYSTEM FOR VEHICLES

FIELD OF THE INVENTION

The present invention relates to an inter-vehicle distance control system for a vehicle for safely maintaining the distance between the vehicle and an object such as another vehicle travelling ahead thereof, by detecting the distance from the object and the relative speed by the utilization of electromagnetic waves, ultrasonic waves, or the like.

RELEVANT ART

In recent years, an increased number of vehicles and increased driving speeds have been giving rise to a correspondingly sharp increase in the number of rear-end collision accidents, and this problem is now a social problem. In an effort to solve this problem there have been proposed many automatic control systems for vehicles wherein the distance from a preceding vehicle and a relative speed are measured at all times by the utilization of a radar system and when the measured values exceed predetermined levels braking is actuated automatically.

However, such conventional systems involve the following problems.

First, since the radar system merely detects whether or not there is an object ahead, it is difficult to judge whether the detected object will cause a danger. In the event that the detected signal is a false signal, an unnecessarily actuated braking may cause a danger of being hit from the rear by a succeeding vehicle, and this is not desirable from the standpoint of safety.

Such a false signal may be generated for example where there is a viaduct or road sign, where rain is falling heavily, or where the vehicle is passing a sharp valley constituting of an upward slope and a downward slope.

Secondly, there sometimes occurs the case where the braking action by the automatic braking system and the intended driving of the vehicle operator are different from each other. There are three means for avoiding a vehicle collision, namely, braking, steering and acceleration. Therefore, even when a vehicle is travelling ahead, collision is avoidable by a by-passing operation consisting of steering and acceleration if there is enough of an inter-vehicle distance still remaining. In such a case, it is unsuitable in the actual driving situation to completely disregard the driver's will and have the braking system operated only automatically.

Because of the above-mentioned problems, the conventional systems of such type have not been acceptable. As to the second problem mentioned above, there has been proposed the concept of changing the measuring range with the angle of rotation of the steering wheel as a parameter, but such an idea is still incomplete technically.

The present invention effectively solves the above problems.

It is an object of the present invention to provide an inter-vehicle distance control system for a vehicle wherein the distance from a preceding object and a relative velocity therebetween are detected by a detection system such as a radar system, and when this distance has become shorter than a predetermined value, a reaction force is imparted to a throttling operation member such as a throttling pedal, thereby advising the vehicle operator of this fact.

It is another object of the present invention to provide an inter-vehicle distance control system for a vehicle constructed such that when the vehicle has come abnormally close to a preceding object, thus giving rise to an increased danger, an automatic braking system is immediately actuated to mitigate a possible collision for minimizing the damage of a potential accident, while in principle the driver's will has priority in response to a reaction force generated at a throttling operation member such as a throttling pedal.

It is a further object of the present invention to provide an inter-vehicle distance control system for a vehicle wherein the detecting capability of a detection system such as a radar system for detecting interfering objects may be maintained at a high level without the need to narrow its detection range, and even if a false signal is issued there is assured a smooth driving condition with priority given to the driver's will.

A preferred embodiment of the present invention will be described in detail hereinbelow with reference to the accompanying drawings.

DETAILED DESCRIPTION OF THE INVENTION

Figure 1:
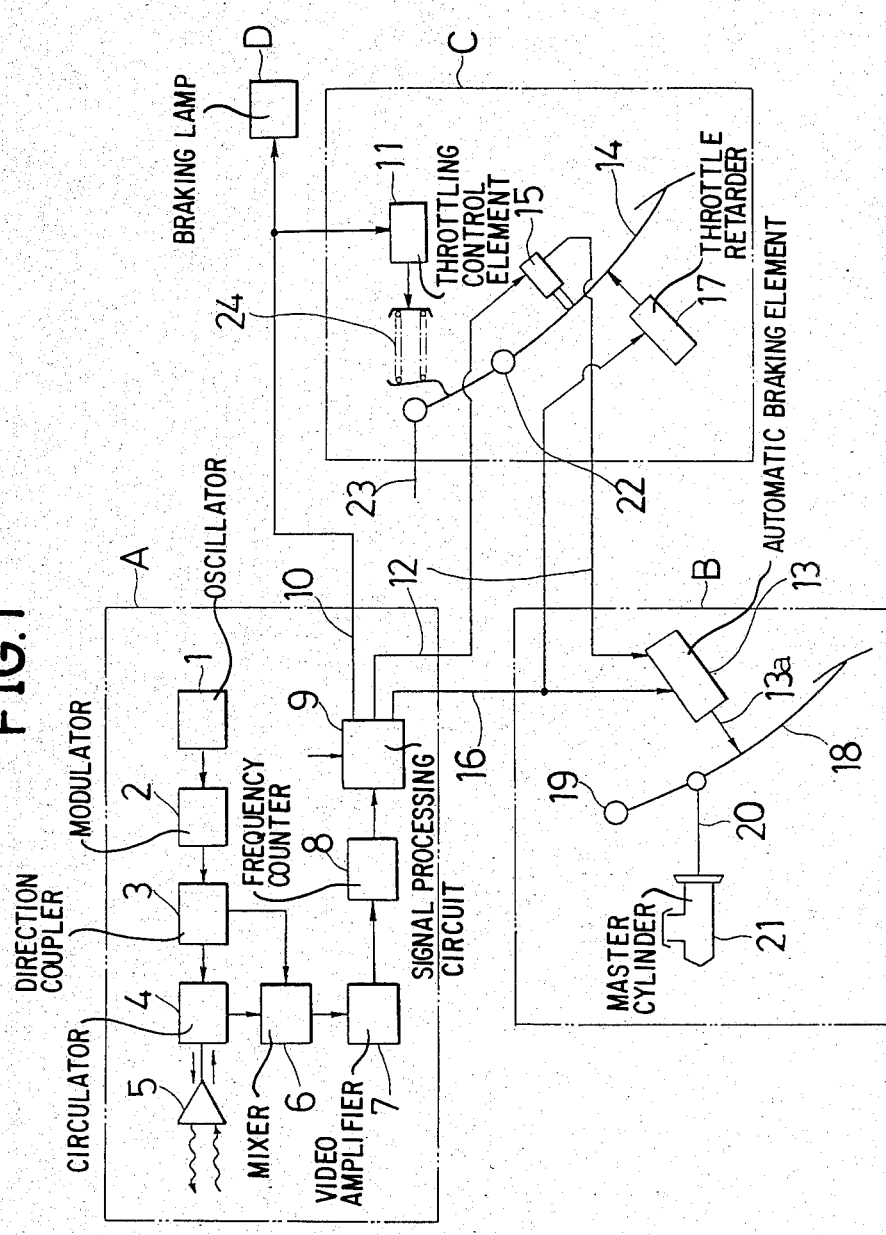
FIG. 1 is a block diagram of an inter-vehicle distance control system according to an embodiment of the present invention.

In FIG. 1, the reference symbol A designates a detection system of a vehicle for detecting the distance between the vehicle and a preceding vehicle and a relative speed therebetween and for comparing respective thus detected values with predetermined ones; the symbol B designates a braking control system of the vehicle comprising a braking pedal and a device for automatically controlling it; the symbol C designates a throttling control system comprising a throttling pedal and a device for automatically controlling it; and the symbol D designates a braking lamp disposed on the rear of the vehicle.

Referring now to the detection system A, there is employed a FM-CW radar system, wherein oscillatory waves generated at an oscillator 1 are modulated by a modulator 2 and output therefrom is divided by a directional coupler 3 into two groups of waves, one being sent through circulator 4 to an antenna 5 from which they are radiated as radio waves toward a preceding object and the other being sent to a mixer 6. Reflected waves from the object are received by the antenna 5, and sent through the circulator 4 to the mixer 6, where these waves are mixed with those waves directly transmitted from the directional coupler 3 to create a signal of beat frequency. This beat frequency signal is weak, and amplified up to a required voltage level by a video amplifier 7, then this amplified signal is transmitted to a frequency counter 8 where the frequency is read-out, and this read-out value of beat frequency is provided to a signal processing circuit 9.

In the signal processing circuit 9 there is calculated a distance X between the vehicle and the object and a relative velocity $V_R$ therebetween on the basis of the beat frequency value, and there is determined a proper distance $X_S$ from the object at that time by using a velocity signal $V_S$ sent from the speedometer in the vehicle and the relative speed $V_R$, according to a predetermined proper distance characteristic function. Then, the proper distance $X_S$ is compared with the actual distance X, and on the basis of a difference $X_S$-X the following output signals are produced.

Where the difference $X_S$-X is larger than a predetermined maximum reference value, a (first) signal is generated through an output line 10, whereby the stop lamp D is lit at a luminance proportional to that signal level, and at the same time an element 11 in the throttling control unit C is operated to urge a throttling pedal 14 toward its idle position side.

If the value $X_S$-X continues increasing and becomes larger than a predetermined intermediate reference value notwithstanding the provision of the aforesaid throttling action, the signal processing circuit 9 issues another (third) signal through an output line 12 with a limit switch 15, in order to operate an automatic braking element 13 in the braking control system B. However, since the limit switch 15 is provided at an intermediate point of the output line 12 so as to be turned on or off according to the position of the throttling pedal 14, the intended signal transmission is not effected except when the limit switch 15 is closed.

Furthermore, when the distance from the object has become smaller and reached a predetermined minimum reference value presumably indicative of unavoidable collision, the signal processing circuit 9 generates still another (second) signal through an output line 16 whereby the automatic braking element 13 is directly operated to effect the braking and at the same time a throttle retarder 17 is operated to hold the pedal 14 at the idle position without fail.

Referring now to the braking control system B, a braking pedal 18 is adapted to rotate about a pivot point 19 in the vehicle body, and this pivotal motion allows a master cylinder 21 to be operated through a push rod 20. Preferably, between the master cylinder 21 and the push rod 20 there is provided a vacuum booster (not shown). The braking pedal 18 can be moved to its operating position not only by a treading force of the operator but also by the automatic braking element 13 according to what has previously been noted.

The automatic braking element 13 used in this embodiment is of such a type that a force indicated by an arrow 13a is applied to the pedal 18 by means of a hydraulic cylinder or the like. In the automatic braking element 13, the force for actuating the master cylinder 21 in response to the signal on the output line 12 and the actuating force for the same cylinder in response to the signal on the output line 16 are desirably not the same; that is, the element 13 may be constructed such that the braking force based on the signal on the output line 16 is stronger than that based on the signal on the output line 12.

If the vacuum booster is included between the master cylinder 21 and the push rod 20, the automatic braking element 13 may be constructed so as to utilize this booster for actuation of the master cylinder. Even in this case, as mentioned above, the braking forces caused by the output lines 12 and 16 may preferably be made different.

Referring now to the throttling control system C, the throttling pedal 14 is mounted so as to be pivotable about a pivot point 22 with respect to the vehicle body, and when it is moved pivotally in a clockwise direction in FIG. 1 by virtue of a treading force applied at the lower end of the pedal 14 by the vehicle operator, a butterfly valve (not shown) of a carburetor (not shown) is opened through a throttling wire whereby an accelerating force can be exerted on the vehicle. On the other hand, when the throttling pedal 14 is returned in the opposite direction by a spring 24, an engine braking is effected to decelerate the vehicle.

Engaged with the throttling pedal 14 are: the throttling control element 11 for providing the spring 24 with a variation of resiliency according to the intensity of the signal on the output line 10 from the signal processing circuit 9 thereby urging the pedal 14 to its idle position side; the foregoing limit switch 15 adapted to be closed when the throttling pedal 14 is in its idle position; and the retarder 17 for holding the throttling pedal 14 in its idle position in response to the signal on the output line 16.

For the retarder 17 there may be used a hydraulic or pneumatic cylinder which functions to push the throttling pedal 14 back to the idle position with a minimum time lag in response to the signal on the output line 16.

Figure 2:
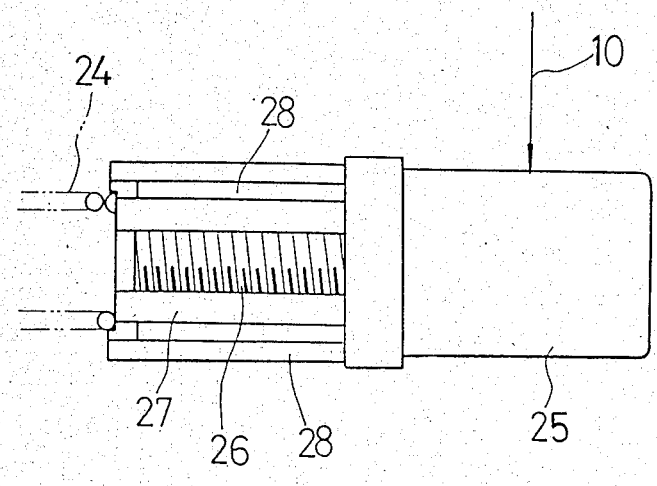
FIG. 2 shows an example of a throttling control unit.

Regarding the throttling control element 11, a particular example thereof is shown in FIG. 2, in which the element 11 comprises a screw 26 mounted on an output shaft of a pulse motor 25, a nut 27 fitted over the screw 26, and two rails 28 for preventing the rotation of the nut 27. The pulse motor 25 is fixed to the vehicle body, and when it rotates the screw 26 in response to the signal on the output line 10, the nut 27 is moved to the left in the figure, so that a variation of resiliency proportional to the signal can be imparted to the spring 24.

Referring now to the braking lamp D, there may be used an existing braking lamp, provided its luminance is not fixed but rather is variable in proportion to the intensity of the signal on the output line 10. The operation of the above construction is described hereinbelow.

Even when there is an interfering object such as a vehicle ahead, if the object is so far away that the radar detection system A does not detect any danger, the signal processing circuit 9 provides no signal on any of the output lines 10, 12 and 16, so that the vehicle operation can be performed on the basis of the driver's judgment only. In such state, the vehicle driver can effect the engine braking by releasing his foot from the throttling pedal 14, or he can actuate the brakes any time by treading the braking pedal 18.

When the object approaches and the radar detection system A detects the possibility of collision and provides a signal through the output line 10, the throttling control element 11 operates to apply a force to the throttling pedal 14 so as to return the latter to its idle position. The vehicle driver is warned by feeling the weight of the pedal 14 based on the reaction force. At the same time, the braking lamp D is lit whereby a succeeding vehicle is advised of a possible impending actuation of the brakes.

In the above case, the reaction force transmitted as a warning to the vehicle driver through the pedal 14 is proportional to the intensity of the signal on the output line 10, so the vehicle driver can fully recognize the degree of the possibility of collision with the interfering object. In case the vehicle driver continues to tread the throttle pedal 14 in opposition to the above reaction force, there will be no sudden actuation of the brakes for the vehicle against the driver's will, nor will a decelerated state occur. Conversely, when the vehicle driver anticipated a danger, he may slacken the treading force on the pedal 14. Particularly, when the vehicle drive is unaware of a preceding object because of looking to the side while driving or the like, the pedal 14 will be returned little by little by virtue of the above reaction force which opposes the constant treading force of the vehicle driver, whereby the danger of collision can be avoided or reduced.

In such a state, if the vehicle driver continues to tread the throttle pedal 14 in opposition to the increased reaction force, the possibility of collision becomes larger and the detection system A intensifies the signal on the output line 10 and at the same time outputs a signal through the output line 12. In this case, because of the limit switch 15 at an intermediate point of the output line 12, the automatic braking operation based on the signal on the output line 12 is under the vehicle driver's judgment; accordingly, if the driver desires to actuate the brakes and releases his foot from the throttling pedal 14 for treading the braking pedal 18, the limit switch 15 is closed to start braking immediately. In this case, it is possible to save the time required for the vehicle driver to move his foot from the throttling pedal 14 onto the braking pedal 18. On the other hand, as long as the vehicle driver continues depressing the throttling pedal 14 against the reaction force, the braking operation by the automatic braking element 13 is not effected since the limit switch 15 is open.

When the throttling pedal 14 is returned to its idle position before a signal is issued through the output line 12 and the engine braking is being actuated, if the possibility of collision has increased because a preceding vehicle has effected a sudden braking or for some other reason and there is issued the signal through the output line 12, the brakes will be actuated automatically since the limit switch 15 is already closed. In this case, there will arise no problem because the vehicle driver agrees to the actuation of the brakes.

In case a preceding vehicle suddenly changes its speed from a cruising speed to a zero speed as in the case of a multiple vehicle collision on an expressway, or in case the driver of a preceding vehicle suddenly actuates the brakes notwithstanding the foregoing operation for deceleration of the vehicle in question or in case the situation suddenly changes contrary to the vehicle driver's judgment and it becomes impossible to avoid collision, the detection system A issues a signal through the output line 16 to allow the retarder 17 to force the throttling pedal 14 back to its idle position, and at the same time the automatic braking element 13 is operated to apply the brakes fully. In this case, since the pedal 14 is sure to be held in its idle position by the retarder 17, the mass of the driver's foot due to an inertial forward acceleration at the time of braking is prevented from being exerted on the pedal 14 to the extent of moving the latter to its accelerating position.

Figure 3:
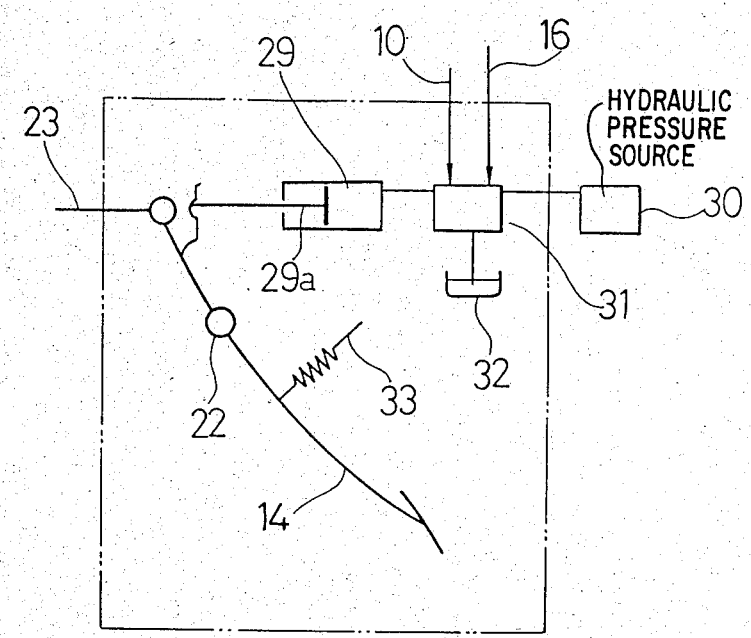
FIG. 3 shows another example of a throttling control unit.

In FIG. 3 there is shown another example of the throttling control system, wherein the same elements are indicated with the same reference numerals. The numeral 29 designates a hydraulic cylinder, into which is supplied a pressurized oil from a hydraulic pressure source 30 through a pressure regulating valve 31. One end of a piston rod 29a is connected to the upper end of a throttling pedal 14, and when a signal is provided through an output line 10 the opening of the valve 31 is adjusted in proportion to the intensity of the signal and the hydraulic pressure is transmitted to a cylinder 29 to urge the throttling pedal 14 to its idle position through a rod 29a. In the absence of a signal, the pressure regulating valve 31 allows the pressurized fluid from the hydraulic pressure source 30 to flow into a tank 32; thereby removing the load on the pump. Basically, the pressure regulating valve of such a construction may be a control valve of a power steering device having a hydraulic reaction chamber.

The throttling pedal 14 is pulled to its idle position at all times by means of a known return spring 33. In this embodiment, in place of the retarder 17 in the above embodiment, the pressure regulating valve 31 is actuated so as to obtain its maximum pressure with a signal on the output line 16 which directs a braking control system B to apply a full braking, whereby the same effect is attained. The hydraulic cylinder 29 may be replaced by a diaphragm type actuator driven with a pneumatic pressure.

The limit switch 15 in the aforesaid embodiment is not shown in FIG. 3, but in the ordinary throttling system the throttle valve and the throttling pedal are positioned in one-to-one relationship, so it is convenient to mount a limit switch on the pedal side. But in the case of a vehicle equipped with an automatic cruise control device, the limit switch 15 should be affixed to a part other than the throttling pedal.

In the above embodiment the detection system A utilizes a radar system, but it will be understood that there may be employed a system which utilizes ultrasonic waves.

As another example of the braking lamp D there may be used one wherein the number of times of flashing thereof varies according to the intensity of a signal on the output line 10, that is, the interval of flashing is changed, whereby a succeeding vehicle can be advised of the degree of a possible deceleration.

From the foregoing description it should be readily clear that the present invention attains the following effects.

Since the invention is constructed such that a reaction force is produced at a throttling pedal according to the degree of a possible danger, the vehicle driver can directly feel the degree of the danger, and since the invention is constructed so that the vehicle driver's will has priority over a mechanical judgment except in an emergency, it is possible to overcome problems, e.g., rear-end collision, which may be caused by the operation of a conventional automatic braking system.

When the driver's attention is not directed to the front, such as due to inattention or when looking to the side while driving, the throttling pedal gradually moves to its idle position against the treading force of the vehicle driver, so that collision can be prevented from occurring.

A manner of driving such as turning a T-shaped corner with a guardrail placed ahead while the tires are screeching at a certain degree of high speed is not desirable from the standpoint of traffic hindrance. In such a case, an increased reaction force of the throttling pedal in accordance with the invention calls on the vehicle driver to stop such as act.

An initial signal for detecting an object is varied according to the possibility of collision, and the throttle closing action with this signal can be controlled by the vehicle driver through the throttling pedal, so that it is no longer necessary to fear the occurrence of a false signal which has heretofore been a problem and hence it is not necessary to narrow the detection range of the detection unit.

In case of an emergency wherein the possibility of collision is very high, the throttling pedal is returned to its idle position quickly and independently of the vehicle driver's will, and the automatic braking device is sure to be operated, so that it is possible to promptly avoid collision or mitigate collision effectively.

We claim:

1. An inter-vehicle distance control system for a vehicle having brake means and throttle means, comprising:
   a control signal generating means for providing a control signal output indicative of a possibility of collision with an object ahead of the vehicle;
   throttle control means for imparting to a throttle pedal a reaction force according to the intensity of said control signal output;
   said reaction force being imparted in the direction of urging said throttle pedal to the engine-idling position thereof;
   brake control means for operating in conjunction with said throttle control means in response to said control signal output to brake the vehicle automatically if a possibility of collision increases in the throttle control means activated condition;
   said control signal output including a first signal provided when the distance between said vehicle and said object drops below a predetermined maximum reference value;
   said first signal being fed directly to said throttle control means to operate said throttle control means;
   said throttle control means including an assembly for producing said reaction force according to the intensity of said first signal;
   said control signal output includes a second signal provided when the distance between said vehicle and said object drops below a predetermined minimum reference value; and
   said second signal serving to operate said brake control means to brake said vehicle regardless of the operative condition of said throttle pedal.

2. A control system according to claim 1, wherein:
   said reaction force producing assembly includes a spring engaged with said throttle pedal and means for providing said spring with a variation of resiliency in dependence upon said first signal.

3. A control system according to claim 2, wherein:
   said resiliency providing means has a control motor for providing a rotational displacement in dependence upon said first signal and means for converting said rotational displacement into a linear displacement of said spring.

4. A control system according to claim 1, wherein:
   said reaction force producing assembly includes a hydraulic cylinder connected to said throttle pedal and valve means for supplying hydraulic fluid to said hydraulic cylinder to apply hydraulic pressure in dependence upon said first signal.

5. A control system according to claim 1, wherein: in addition to operating said throttle control means, said first signal operates a warning means at the rear of said vehicle.

6. A control system according to claim 5, wherein:
   said warning means is a light which is operated such that the intensity of illumination, or rate of flashing, thereof is dependent upon the strength of said reaction force.

7. A control system according to claim 1, wherein:
   said control signal output includes a third signal provided when the distance between said vehicle and said object drops below a predetermined intermediate reference value, said third signal serving to operate said brake control means to brake said vehicle if said throttle pedal is in an engine-idling condition thereof.

8. A control system according to claim 7, wherein:
   said third signal is fed to said brake control means via a limit switch which is controlled by said throttle pedal.

9. An inter-vehicle distance control system for a vehicle having brake means and throttle means, comprising:
   a control signal generating means for providing a control signal output indicative of a possibility of collision with an object ahead of the vehicle;
   throttle control means for imparting to a throttle pedal a reaction force according to the intensity of said control signal output;
   said reaction force being imparted in the direction of urging said throttle pedal to the engine-idling position thereof;
   brake control means for operating in conjunction with said throttle control means in response to said control signal output to brake the vehicle automatically according to the intensity of said control signal output;
   said control signal output including a first signal provided when the distance between said vehicle and said object drops below a predetermined maximum reference value;
   said first signal being fed directly to said throttle control means to operate said throttle control means;
   said throttle control means including an assembly for producing said reaction force according to the intensity of said first signal;
   said control signal output includes a second signal provided when the distance between said vehicle and said object drops below a predetermined minimum reference value, said second signal serving to operate said brake control means to brake said vehicle regardless of the operative condition of said throttle pedal; and
   said control signal output including a third signal provided when the distance between said vehicle and said object drops below a predetermined intermediate reference value, said third signal serving to operate said brake control means to brake said vehicle if said throttle pedal is in an engine-idling condition thereof.

10. A control system according to claim 1, wherein:
    said second signal is fed directly to said brake control means.

11. A control system according to claim 1, wherein:
    said brake control means includes an automatic braking device operable by said second or said third signals; and
    said braking device operably cooperates with said second and third signals such that the braking force initiated by said second signal is greater than that initiated by said third signal.

* * * * *